(12) United States Patent
Carey

(10) Patent No.: US 8,209,153 B2
(45) Date of Patent: *Jun. 26, 2012

(54) METHOD AND APPARATUS FOR PARAMETRIC DESIGN OF CUSTOM DECORATIVE STONEWORK

(76) Inventor: Richard Carey, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/906,840

(22) Filed: Oct. 18, 2010

(65) Prior Publication Data

US 2011/0178777 A1 Jul. 21, 2011

Related U.S. Application Data

(63) Continuation of application No. 10/783,365, filed on Feb. 20, 2004, now Pat. No. 7,818,148.

(60) Provisional application No. 60/449,493, filed on Feb. 21, 2003.

(51) Int. Cl.
G06F 17/50 (2006.01)

(52) U.S. Cl. ............ 703/1; 345/419; 345/420; 345/582; 715/765

(58) Field of Classification Search ...... 703/1; 345/419, 345/420, 582; 715/765
See application file for complete search history.

(56) References Cited

U.S. PATENT DOCUMENTS

| | | | | |
|---|---|---|---|---|
| 4,417,564 A | * | 11/1983 | Lawrence et al. | 125/30.01 |
| 6,006,735 A | * | 12/1999 | Schlough et al. | 125/13.01 |
| 6,226,000 B1 | * | 5/2001 | Richens et al. | 345/419 |
| 6,438,922 B1 | * | 8/2002 | DeLeFevre | 52/741.1 |
| 6,664,972 B2 | * | 12/2003 | Eichel et al. | 345/582 |
| 6,906,712 B2 | * | 6/2005 | Lee et al. | 345/420 |
| 7,277,572 B2 | * | 10/2007 | MacInnes et al. | 382/154 |
| 2003/0059558 A1 | * | 3/2003 | Nardi et al. | 428/15 |
| 2005/0081161 A1 | * | 4/2005 | MacInnes et al. | 715/765 |
| 2005/0155316 A1 | * | 7/2005 | Shipley | 52/741.1 |
| 2007/0143082 A1 | * | 6/2007 | Degnan | 703/1 |

* cited by examiner

Primary Examiner — Thai Phan
(74) Attorney, Agent, or Firm — Carr LLP

(57) ABSTRACT

A method, apparatus, and computer program are provided for custom designing primarily decorative stonework. The system permits design of different aesthetic architectural features, which can be of many types and shapes. The dimensions can also be varied to fit the needs of a client, architect or other user of the system due to the use of a parametric calculation unit. These system features assist users in custom designing primarily decorative stonework, improving speed and quality while reducing costs.

23 Claims, 16 Drawing Sheets

STD. 3/8" MORTAR JOINTS

METHOD AND APPARATUS FOR PARAMETRIC DESIGN OF CUSTOM DECORATIVE STONEWORK

CROSS-REFERENCE TO RELATED APPLICATIONS

This application is a continuation of, and claims the benefit of the filing date of, U.S. patent application Ser. No. 10/783,365 entitled METHOD AND APPARATUS FOR PARAMETRIC DESIGN OF CUSTOM DECORATIVE STONEWORK, filed Feb. 20, 2004 U.S. Pat. No. 7,818,148, which claims priority from U.S. Provisional Patent Application No. 60/449,493 entitled "METHOD AND APPARATUS FOR STONEWORK CONSTRUCTION" filed Feb. 21, 2003, and is related to U.S. patent application Ser. No. 10/783,917, entitled "METHOD AND APPARATUS FOR INTERACTIVELY DESIGNING CUSTOM DECORATIVE STONEWORK," filed on Feb. 20, 2004, and to U.S. patent application Ser. No. 10/783,358, entitled "METHOD AND APPARATUS FOR MANUFACTURING OF CUSTOM DECORATIVE STONEWORK," filed on Feb. 20, 2004, the contents of which are hereby incorporated by reference.

FIELD OF THE INVENTION

The present invention relates generally to automated design of custom decorative stonework.

DESCRIPTION OF THE RELATED ART

In the construction industry, decorative stonework has been common feature for a number of years. Larger and larger portions of stone are used in the construction of buildings and houses. Decorative stonework can be made by being cut from natural stone, cut from man-made materials, cast from molds, extruded or any combination of these techniques. Of these techniques, one of the most economical is casting using molds. Generally speaking, casting the stonework allows the aesthetics associated with decorative stonework to be preserved while reducing the overall cost.

The process of manufacturing cast decorative stonework typically involves pouring a limestone-based material into a mold and allowing it to harden. Once the material has hardened it is removed from the mold as a manufactured decorative stonework piece.

In some instances, a product may be formed of a single piece. However, more typically, more complex products, such as door frames, are not molded out of one continuous piece of manufactured stone. Instead, several pieces are assembled, usually at the job site, to yield the structure. The molds, then, are usually for the smaller components of the large whole product.

Architecture is a high art form that has been around since earliest days. The Romans and Greeks were master architects. These groups adopted certain stylistic features that were associated with their architecture. In the traditional organizational scheme, architectural features are each given certain titles. For example, Doric, Ionic, and Corinthian columns are examples of Greco-Roman architectural features. Doric columns are least ornate of the three, having a plain shaft and a simple cap. Ionic columns are more ornate, having flutes caved into the shaft and a more ornate cap, such as scrolls. The Corinthian columns are the most ornate, usually with an extremely ornate cap. However, even through these architectural features accurately describe the features of a structure, the average layperson may not be able to describe a Doric column, let alone know the name of the feature.

The customer is often a layperson and at the start of a project may not even know specifically what feature he or she desires. In fact, most laypersons would typically have only a holistic knowledge or a feel for what he or she wants. Traditional organizational schemes, though, may not necessarily provide a logical correlation to the average layperson.

To alleviate the problem associated with logical associations, it would be desirable to have a database organizational scheme can be employed to better assist a lay customer or a professional in choosing the decorative stonework associated with desired architectural features.

Several problems exist with the design, manufacture, and assembly of manufactured decorative stonework. For a given manufacturer of stone work, the molds can number in the tens of thousands. Changing the proportions of a given architectural feature can be cumbersome. There can be physical limitation as well as aesthetic considerations. Also, by changing the proportions of a given feature, the molds utilized to make the parts that compose the given architectural feature may have to be changed. Compounding the complexity of this problem is the fact that most decorative stonework products are custom designed to fit individual customer's tastes at the time a structure is designed. The decorative stonework products must also meet size and structural requirements dictated by other, non-stonework products (such as a wooden entry door) or natural geographic features of the site. Thus, oftentimes, no two decorative stonework products will be exactly alike.

The parameters required for designing decorative stonework may not be known until the time a design for the entire structure is substantially complete. Nevertheless, decorative stonework must usually be incorporated into the design of a structure at the concept stage or it may be impractical to add later. Thus, the ability to design decorative stonework products at a very early stage of the conceptualization of a structure extremely quickly, from sometimes incomplete parameters, at least to the point that the appearance of the decorative stonework products in conjunction with the structure can be determined and the cost reliably estimated can be the difference between the structure ultimately including or not including any decorative stonework.

Decorative stonework is typically very heavy. It can also be prone to damage during transportation if not properly packaged or unnecessarily handled. Typically, it will not be possible to pre-assemble the components at the stonework manufacturer's facility to ensure proper fit. To maintain an economical product, it is necessary to design and manufacture the components for the custom decorative stonework product, which may be one-of-a-kind, from tens of thousands of parts and their molds in an almost unlimited number of sizes, configurations and styles to fit with an unlimited number of structural designs. Then, all the components and their supporting documentation must be transported to the job site in all the correct sizes and at the right time.

Therefore, there is a need for a method and/or apparatus for facilitating and at least partially automating the process of selection, identification, design and manufacturing of custom decorative stonework products that at least addresses some of the problems associated with conventional methods and apparatuses.

SUMMARY OF THE INVENTION

The present invention provides a method for designing custom decorative stonework. At least one unit of a plurality of units is selected, wherein each unit of the plurality of units at least corresponds to an architectural feature, and wherein each unit of the plurality of units comprises a plurality of parts. At least a primary view is selected, wherein the primary view is at least the overall shape of the at least one unit. At least one profile of a plurality of profiles is selected, wherein each profile of a plurality of profiles corresponds to at least a primary cross-sectional view of the at least one unit. At least one dimension of a plurality of dimensions is input, wherein the at least one dimension is at least a physical dimension of the at least one unit. At least one dimension corresponding to a unit size is parametrically calculated, wherein calculating the at least one dimension further comprises at least determining relative sizes of the plurality of parts of the at least one unit. Also, at least one scaled drawing is generated, wherein the scaled drawing at least has numbers that corresponds to the plurality of parts of the at least one unit.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail.

Figure 1:
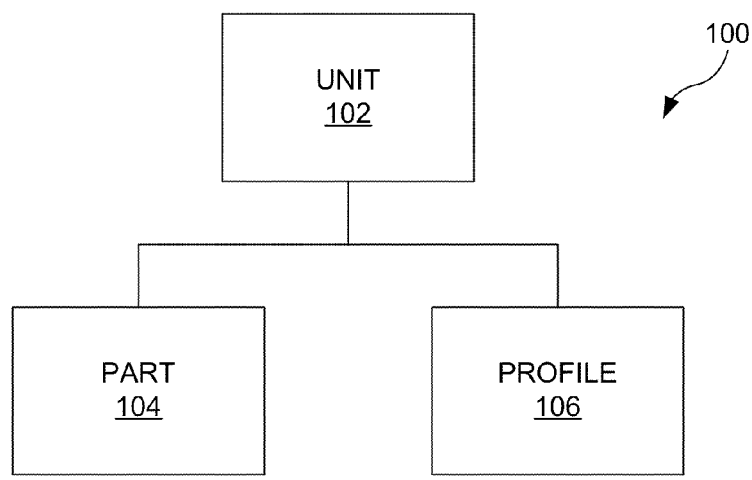
FIG. 1 is a block diagram depicting an improved organizational structure.

Referring to FIG. 1 of the drawings, the reference numeral 100 generally designates an improved organizational structure. The improved organizational structure 100 comprises a unit description 102, part descriptions 104, and profile descriptions 106.

When either a professional or a customer begins the process of choosing stonework, typically there is a first association to a specific item, such as a window. This first association is designated as a unit 102. The unit 102 can be either a very simple or a complex item ranging from a simple feature, such as a window frame, to more complex features, such as gazebos and staircases.

As it is well known, decorative stonework products are often not composed of a single, continuously molded block. Instead, to maximize the ability to create numerous varieties of units 102 while attempting to minimize costs, individual components or parts 104 are utilized. These parts are sometimes interchangeable and, thus, are capable of being used for a number of units. Furthermore, the parts 104 can be increased in size to create a large individual unit. Therefore, in the improved organizational scheme 100, each unit 102 is subdivided into numerous parts 104. Some parts, however, are not properly interchangeable with other parts either for physical or for aesthetic reasons.

To increase the appeal of each of the units 100 and to include as many architectural styles as is possible, each part 104 has an associated profile 106. The profile 106 is typically a vertical or horizontal cross-sectional view of a given part 104. The shapes associated with crown molding are one example of such a profile feature. With crown molding, a piece of wood or stonework is shaped to have curves or shapes on the surface. A cross-sectional view of the crown molding would be a profile. Also, profiles can also be overall views if the surface contains more intricate molded carvings, such as carved leaves.

By creating the associative database, a lay customer or professional is more capable of choosing desired features in stonework. Instead of sorting through either pictures of buildings or of sets of architectural features, a customer or professional can look through components or units 102 of a design scheme. By allowing a customer, specifically, to sort through the varieties of stonework available by unit 102, the attention of the customer will more likely be retained. Preservation of a customer's attention clearly can preserve a possible sale that would provide a benefit to the customer and to the manufacturer/retailer.

Figure 2:
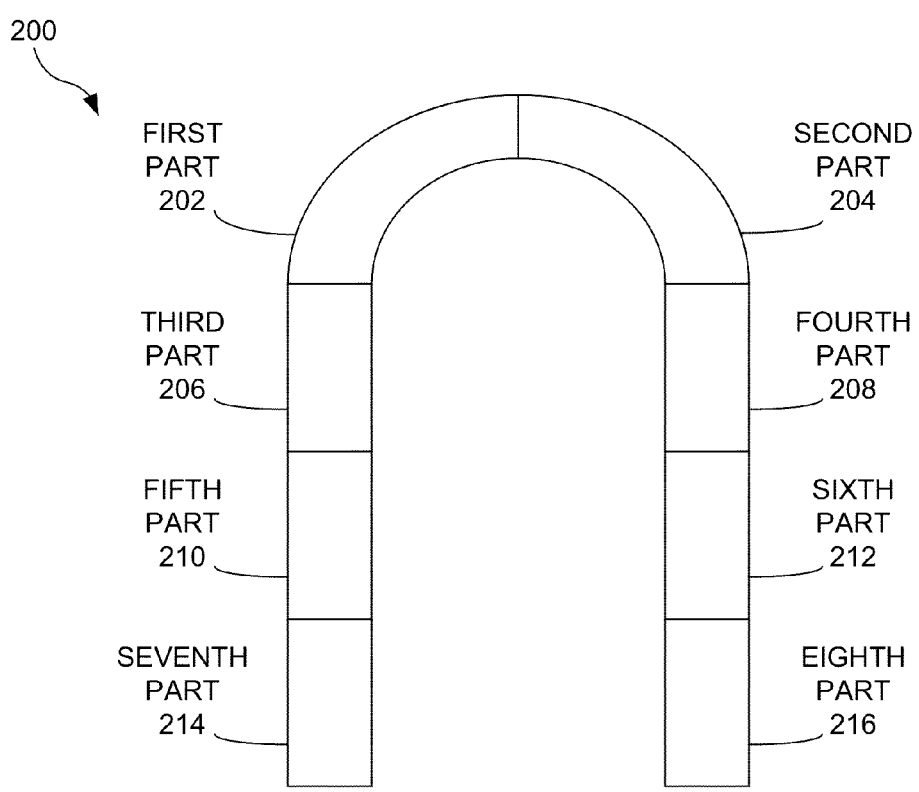
FIG. 2 is a block diagram depicting a circle top doorway.

Referring to FIG. 2 of the drawings, the reference numeral 200 generally designates an example of a unit. The unit comprises a first part 202, a second part 204, a third part 206, a fourth part 208, a fifth part 210, a sixth part 212, a seventh part 214, and an eighth part 216.

The unit 200 is an example of a stone circle top door frame. The door frame of the unit 200 is not composed of a single, continuous piece of manufactured stone. Instead, the door frame of the unit 200 is composed of eight distinct parts 202, 204, 206, 208, 210, 212, 214, and 216. Each of the eight parts 202, 204, 206, 208, 210, 212, 214, and 216 can vary in size depending on the dimensions of the door frame itself.

Moreover, the style of the door frame of the unit 200 can be changed by interchanging some parts. For example, if a customer chooses to have an eyebrow door frame instead of a circular door frame, as shown in FIG. 2, then most of the original parts can be retained. The difference between an eyebrow door frame and a circular door frame is the arc across the top of the frame. The top of the circular door frame has a radius equal to one half the distance between the sides of the doorframe, whereas the top of an eyebrow doorframe is larger than the one half the distance between the sides of the doorframe. Therefore, it is possible to retain the third part 206, the fourth part 208, the fifth part 210, the sixth part 212, the seventh part 214, and the eighth part 216. Hence, the first part 202 and the second part 204 can be replaced with parts that possess a larger arc.

Providing the customer with an association as expressed can therefore lead to easier choosing of design elements. If circular door frames and eyebrow door frames are associated with different architectural styles, a customer may holistically know that he or she prefers an eyebrow door frame. However, if the customer has a particular affinity for an architectural style that does not incorporate eyebrow door frames, then a customer can become frustrated because he or she does not know the name of the particular style of door frame or the specific architectural style to which the door frame belongs. Hence, organization of stonework into units, such as the door frame of unit 200, can assist the customer.

Figure 3:
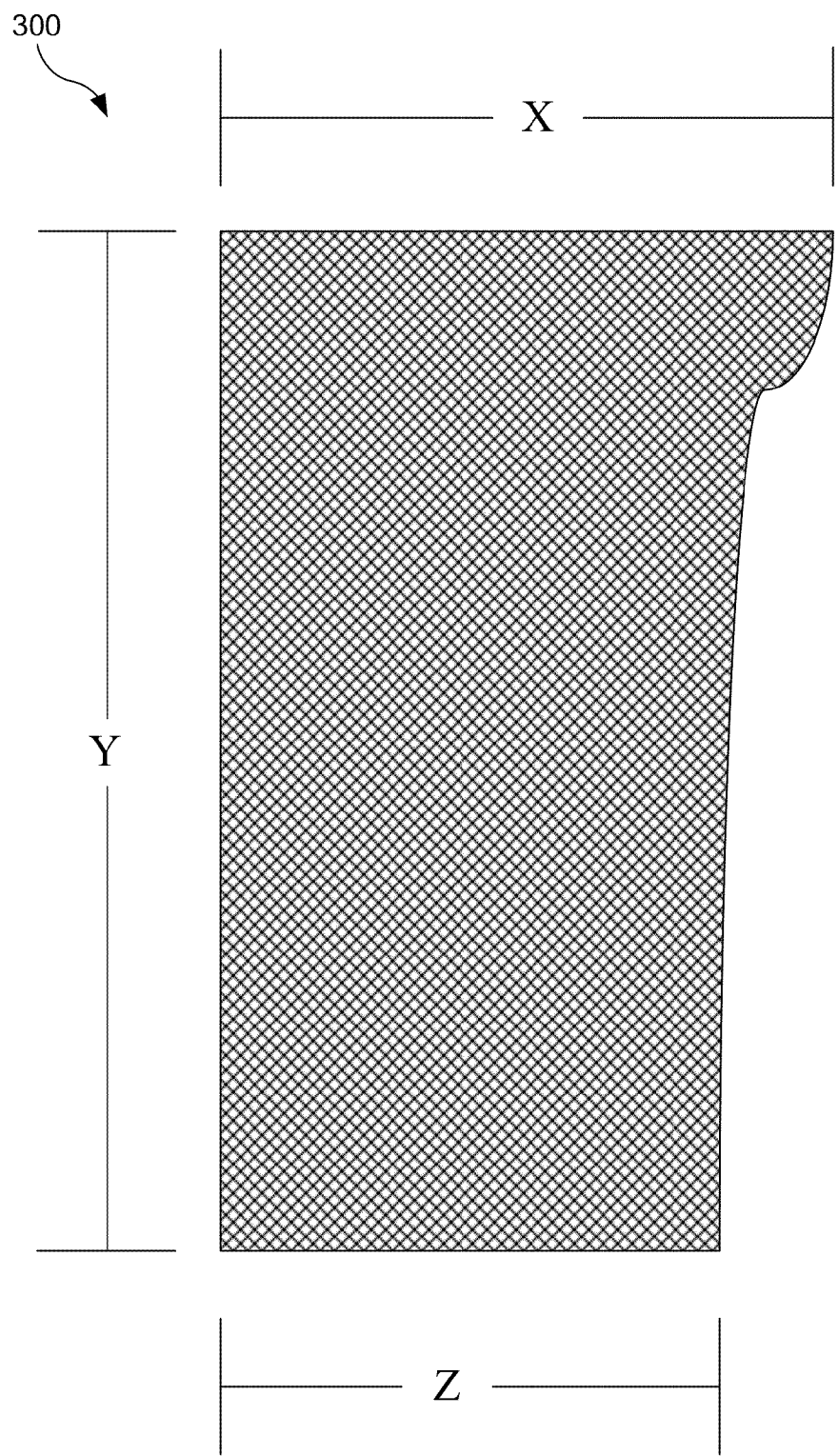
FIG. 3 is a first example of a profile.
Figure 4:
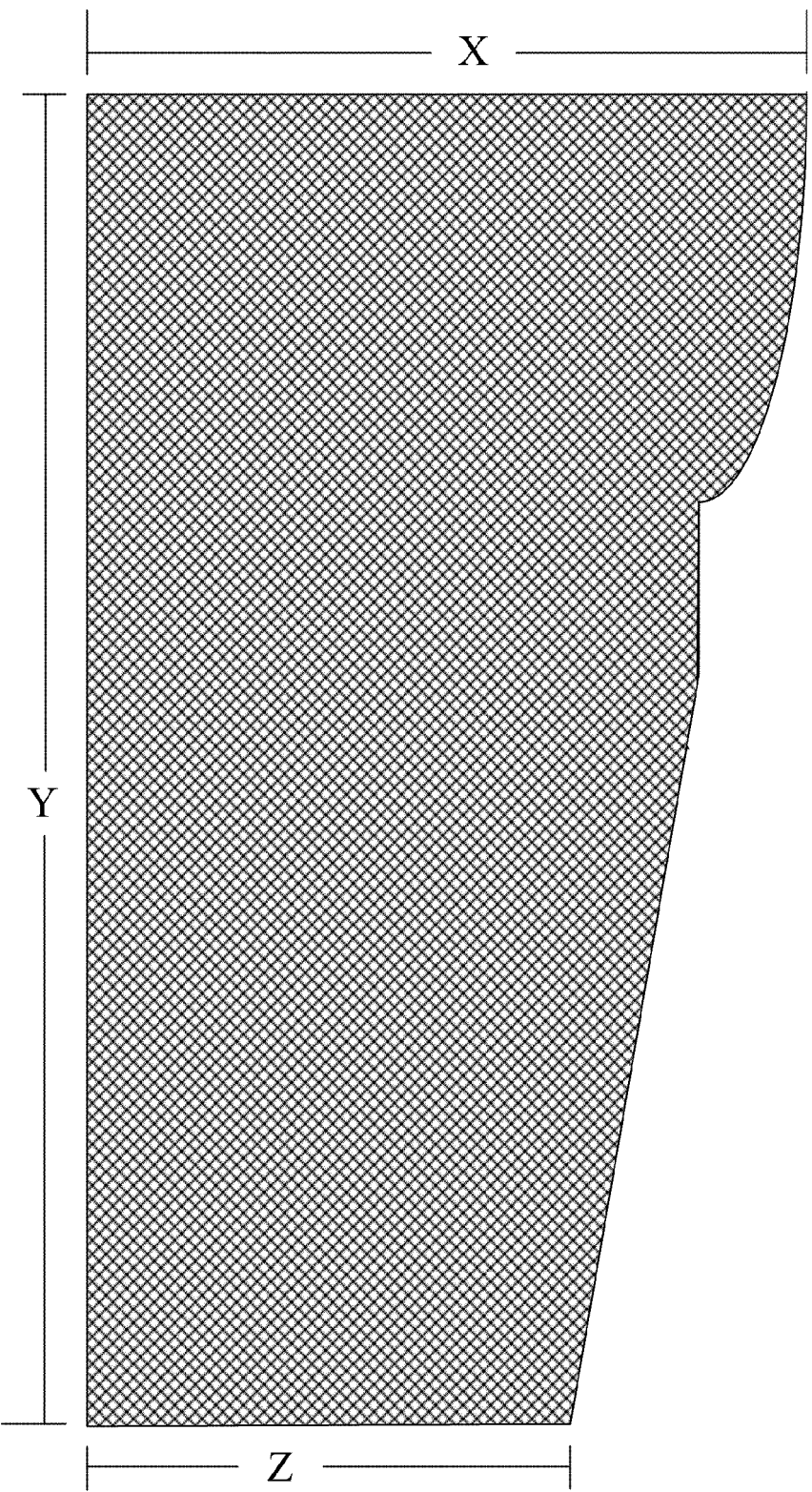
FIG. 4 is a second example of a profile.

FIGS. 3 and 4 are examples of profiles. Both the first profile 300 and the second profile 400 are horizontal cross-sections of a given part. The dimensions of each profile 300 and 400 are typically measured by three dimensions. The height Y, the upper depth X and the lower depth Z are related to the overall size of the given part 104. There are profiles that can be utilized in order to provide varying degrees of aesthetic flair.

Figure 5A:
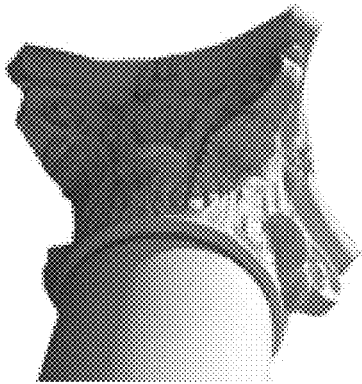
FIGS. 5a-5d are examples of units.
Figure 5B:
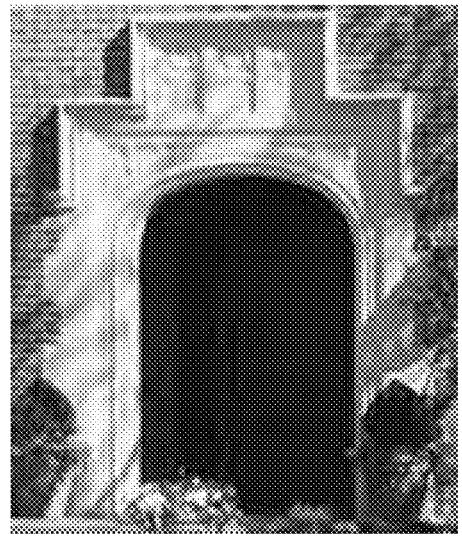
Figure 5C:
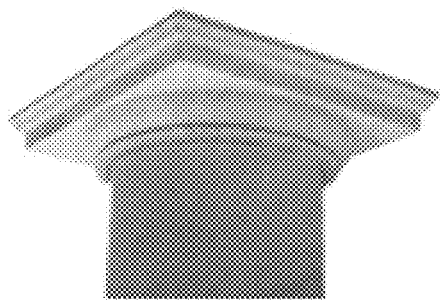

FIGS. 5a-5d are examples of units. FIG. 5a depicts an unfluted Corinthian column, and FIG. 5c depicts an unfluted Doric column. Specifically, the picture of FIGS. 5a and 5c only depict the caps of each of the respective columns because the caps are what differentiate the Corinthian column from the Doric column.

Figure 5D:
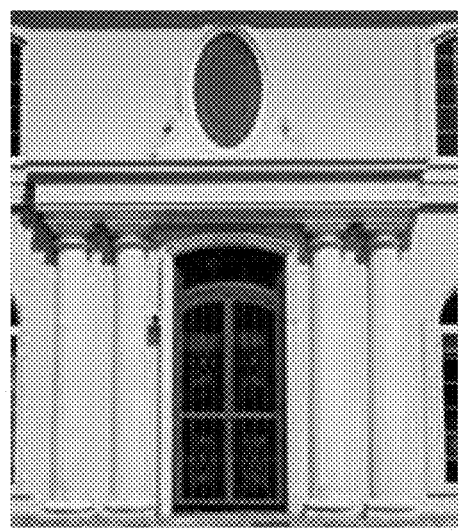

FIGS. 5b and 5d, on the other hand, depict more complex units. Specifically, each of the respective pictures depicts an entryway. FIG. 5b is denoted as a "Castile Aragon II" that is a style of architecture common to the Aragon region of Northeast Spain. FIG. 5d is denoted as "Boxwood Manor" that is a style of architecture more indicative of the Southwest United States.

Figure 6:
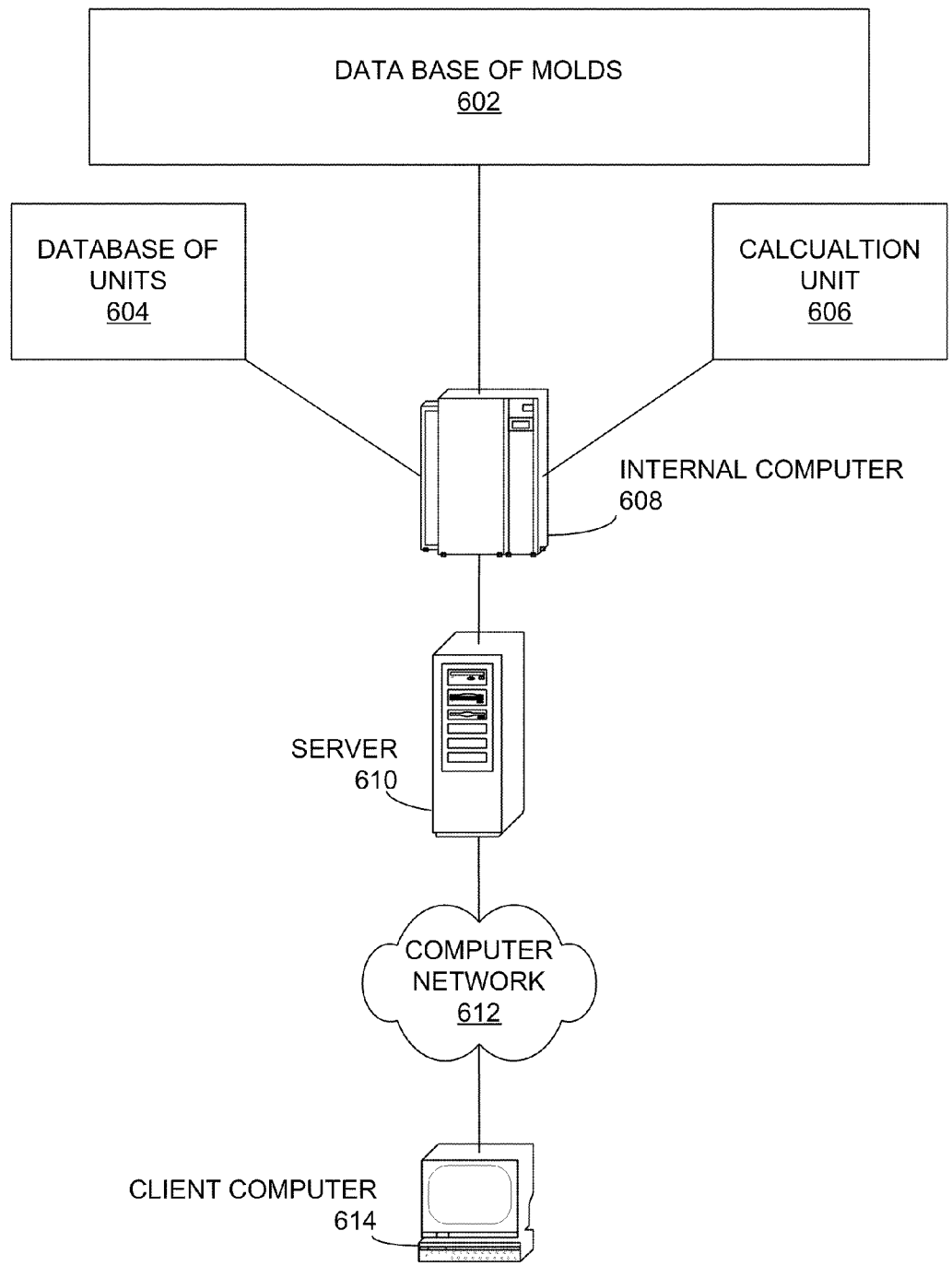
FIG. 6 is a block diagram depicting the system for adjusting dimensions of a given unit.

Referring to FIG. 6 of the drawings, the reference numeral 600 generally designates a system for adjusting dimensions of a given unit. The system 600 comprises a client computer 614, a computer network 612, a server 610, an internal computer 608, a database of units 604, a calculation unit 606, and a database of molds 602.

For the system to operate, a user has to access the software capable of selecting and adjusting units for a given architectural style. A client computer 614 will generally use web-based applications to access the software. However, the user may not necessarily be required to use web-based applications. Typically, though, a user will access a web page and input the desired data to obtain the desired drawings.

In order for the access to take place, a plurality of connections should be made. A client computer 614 is coupled to a computer network 612 through a first communication channel 616. The computer network 612 can be a variety of computer networks including, but not limited to, the Internet. The computer network 612 is then coupled to the server 610 through a second communication channel 618. The server is coupled to the internal computer 608 through a third communication channel 620. The internal computer is then coupled to a database of units 604, a database of molds 602, and a calculation unit 606 through a fourth communication channel 624, a fifth communication channel 626, and a sixth communication channel 622.

Figure 7A:
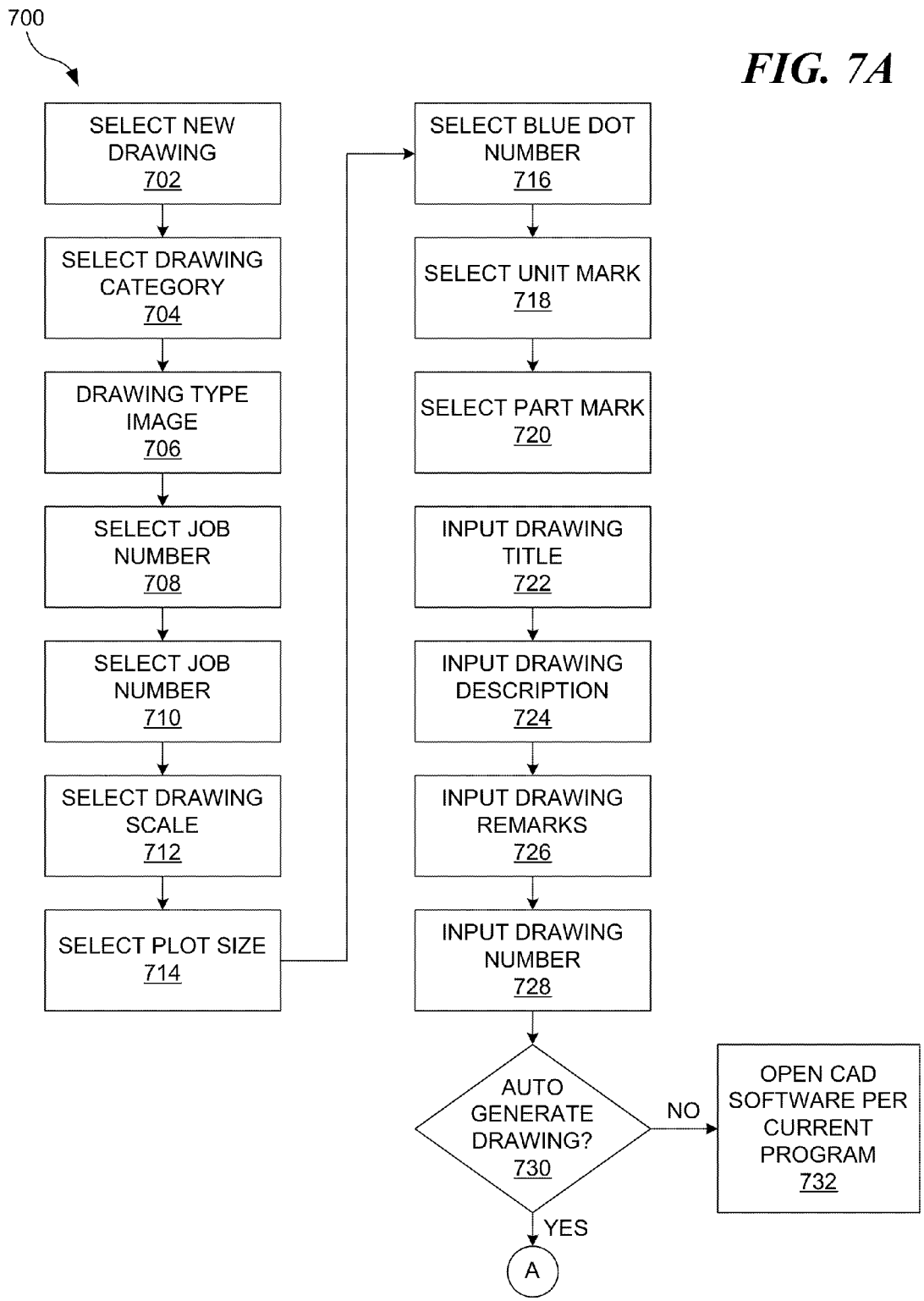
FIGS. 7a, 7b, and 7c depict a flow chart for adjusting the dimensions of a given unit.
Figure 7B:
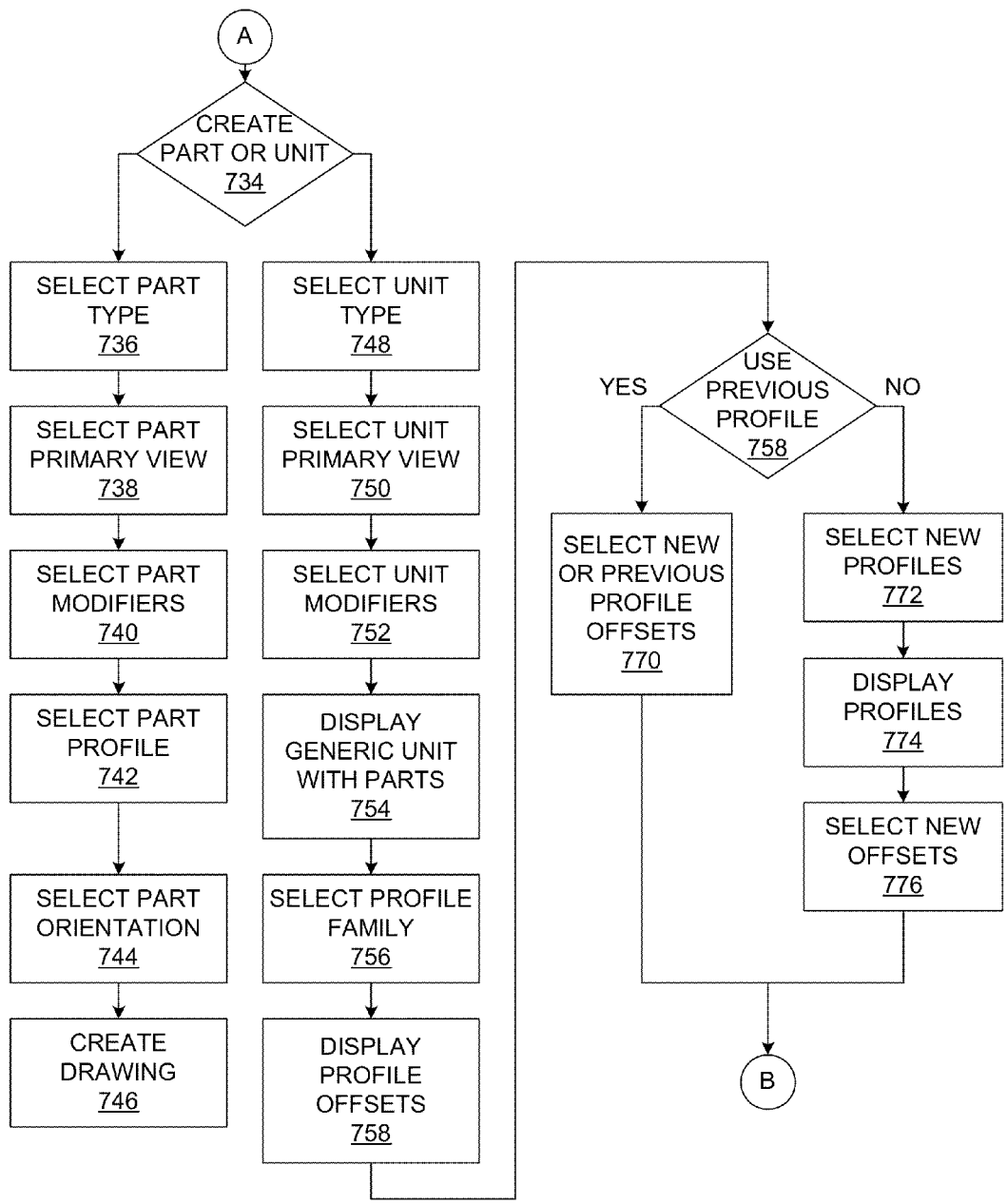
Figure 7C:
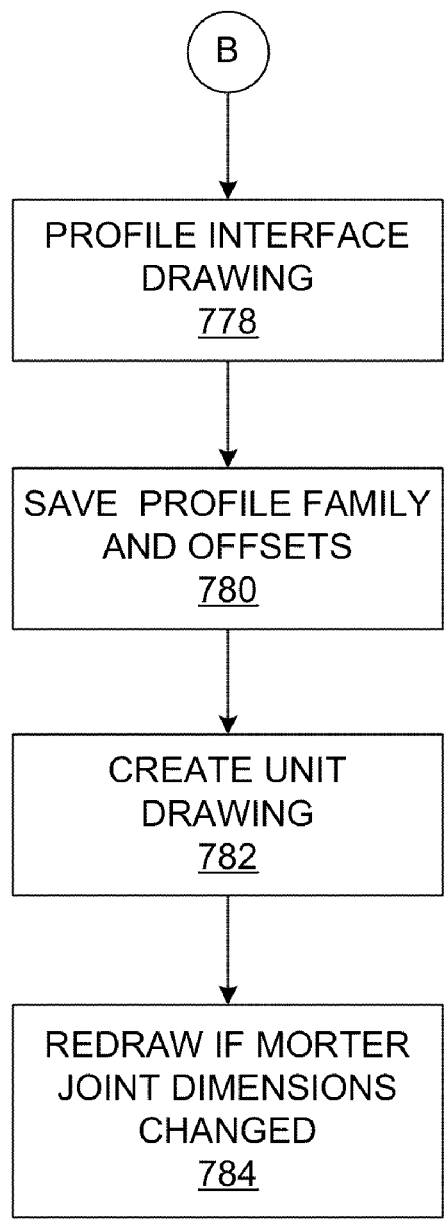

Referring to FIGS. 7a, 7b, and 7c of the drawings, the reference numeral 700 generally designates a flow chart for adjusting the dimensions of a given unit.

In order for the user to utilize the system, the user can input initial data to describe both the uses for the drawings and the basic drawing requirements. In step 702, the user makes a selection that a new drawing is to be created. Then in step 704, the user can then select the drawing category. The drawing category is typically defined as the purpose for the drawing, such as development or a Job "Blue Dot." Once the drawing category has been selected, a drawing type image, such as a parts sheet, is selected in step 706. Then in step 708, the user then selects the drawing type detail, such as the front elevation. The last portion of initial data is the job number, which is a business specific number to identify the job that is input in step 710.

Once a user has input all of the initial data, the data specifics regarding the scale, quantity and type of materials can be input. The user inputs the scale in step 712. Then in steps 714 and 716, respectively, the plot size and "blue dot" number are selected. The user can then select the unit mark or identifier and the part mark or identifier in steps 718 and 720, respectively. Once all of the data regarding the physical features of the unit or part have been input, the drawing is titled, described, remarked and numbered in steps 722, 724, 726, and 728, respectively. These choices allow a user to effectively choose the marking, the scale, and the units or parts for a drawing that is to be rendered.

After the user has input all of the background data, the user is prompted as to whether the drawing should be auto-generated in step 730. If the user does not wish to auto-generate a drawing, a Computer Aided Design (CAD) software package is opened with all of the initially inputted data in step 732. The CAD package can be a variety of software packages, such as AutoCAD®. However, if the user wishes to have an auto-generated drawing, then the user will be further prompted for information.

If the user wishes to have an auto-generated drawing, there is a prompt to create a part or unit in step 734. The parts and units nomenclature is the same nomenclature utilized in the organization scheme of FIG. 1. In fact, the system 600 of FIG. 6 is overlaid on the organization scheme of FIG. 1. Therefore, a user will likely be more willing to utilize the system 600 of FIG. 6 because of the simplicity associated with the logical correlations created in the organizational scheme of FIG. 1.

If the user chooses to create a part, then the user is further prompted regarding parts within the organizational scheme of FIG. 1. In step 736, the user is prompted to select a part type, such as column cap, wherein the parts are selected from the database of units/parts 604 of FIG. 6. Then the primary view is selected in step 738. The primary view of a unit is essentially the overall shape of the unit, for example an eyebrow window frame or a squaretop window frame. For example, a top view is a view of a part from above the part looking down. In step 740, the part modifiers are selected. The modifiers are additional features that can be added to a unit to provide a certain aesthetic style or aesthetic look, such as a sill added to a window frame. Then, the profile of a part is selected in step 742. The profile is essentially a cross-sectional view of a part, such as the examples depicted in FIGS. 3 and 4. However, the profile can be other views, such as a three dimensional carved stone look on a piece of molding. Finally, the orientation is selected in step 744. The orientation is the specific view of a part from any angle including the primary view.

Once all of the features of the drawings have been selected, then in step 746, the drawing is created. The internal computer 608 of FIG. 6 utilizes the database of unit/parts 604 of FIG. 6 to determine the known dimensions and characteristics of the desired part selected. The internal computer 608 of FIG. 6 employs the calculation unit 606 of FIG. 6 to adjust the dimensions of the part. The calculation unit 606 of FIG. 6 utilizes a set of parametric equations to adjust the dimensions of the desired part based on the input dimensions. For example, these equations can include the Pythagoreans theorem, involving sums and squares, and trigonometric equations.

If the user chooses to create a unit, then the user is further prompted regarding units within the organizational scheme of FIG. 1. In step 748, the client is prompted to select a unit type, such as door frame, wherein the units are selected from the database of units/parts 604 of FIG. 6. Then the primary view is selected in step 750. The primary is the generally the core or the most characteristic cross-sectional view of a given unit. For example, a top view is a view of a part from above the part looking down.

In step 752, the part modifiers are selected which are potential, additional features of a unit. Then, the generic unit with all parts is displayed, wherein the parts are labeled with the standardized alpha-numeric identification strings in step 754. Once displayed, the profile family of a unit is selected in step 756. The profile is generally a cross-sectional view of a part, such as the examples depicted in FIGS. 3 and 4. In the case of a unit, a family of profiles is selected because each part contained within a given unit has a specific profile. Also, the profiles within a given unit may vary slightly or drastically. Finally, the profile offsets are displayed in step 744.

After the profile offsets have been displayed, the user is prompted as to whether a previous profile is to be utilized in step 758. If a previous profile is selected, then a new or previous offset is selected in step 770. However, if a previous profile is not selected, then a new profile is selected and displayed in steps 772 and 774, respectively, and new offsets are chosen in step 776. After the respective profiles and offsets have been chosen, then the profile interface drawing is created in step 778, and the settings are saved in step 780.

Once all of the features of the drawings have been selected, then in step 782, the drawing is created. The internal computer 608 of FIG. 6 utilizes the database of unit/parts 604 of FIG. 6 to determine the known dimensions and characteristics of the desired unit selected. The internal computer 608 of FIG. 6 employs the calculation unit 606 of FIG. 6 to adjust the dimensions of each part of the unit. The calculation unit 606 of FIG. 6 utilizes a set of parametric equations to adjust the dimensions of each part of the unit based on the input dimensions. Also, if the mortar joint dimensions have changed then the figure is redrawn in step 784.

In order to implement the process of selecting the desired units with the desired dimensions, a computer program is employed. The computer program typically utilizes a plurality of menus. The menus provide a graphical interface to a user that is more user friendly. Organization of the menu selections mirrors the procedure depicted in FIGS. 7*a*, 7*b*, and 7*c*. However, a plurality of text command prompts, similar to those utilized is such programs as Simulation Program with Integrated Circuit Emphasis (SPICE) can also be employed.

Figure 8:
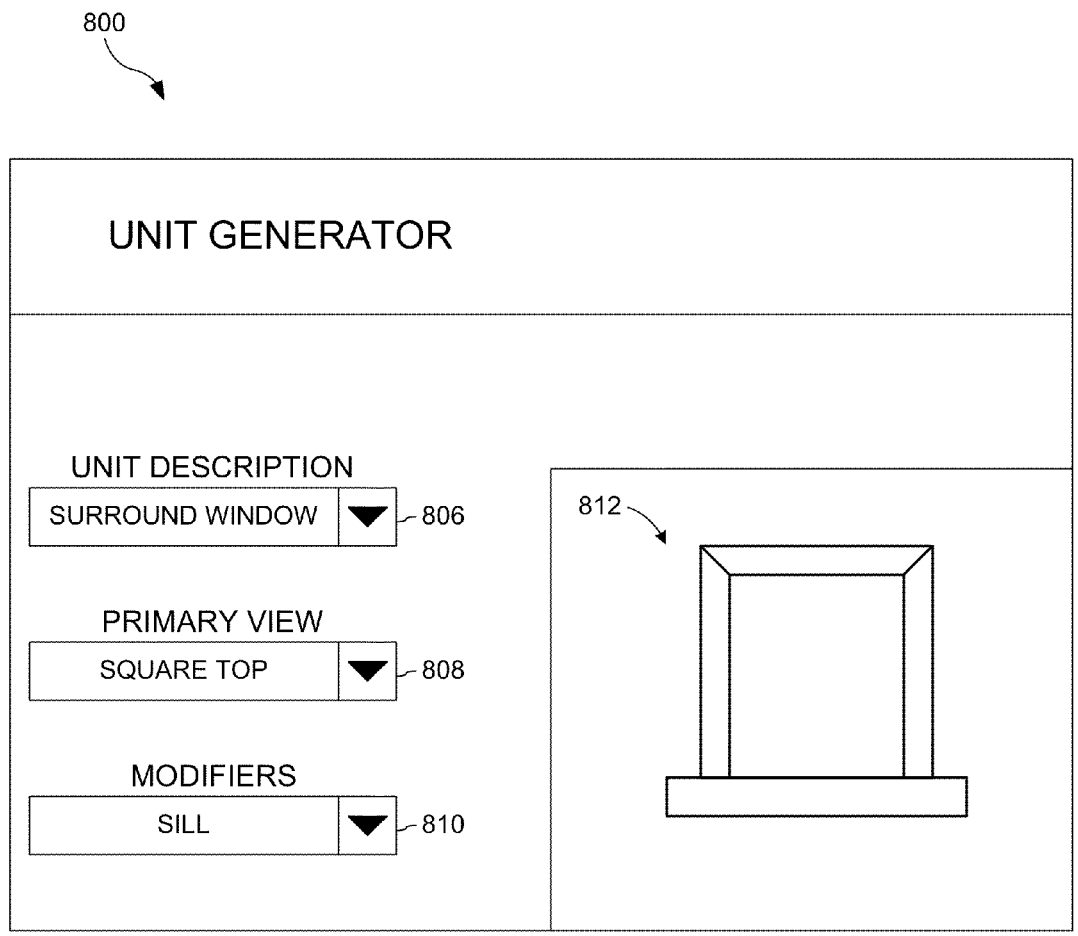
FIG. 8 is a block diagram depicting a unit generation menu.

Referring to FIG. 8 of the drawings, the reference numeral 800 generally designates a block diagram depicting a unit generation menu. The menu 800 comprises a menu label 802, a first pull-down selection window 806, a second pull-down selection window 808, a third pull-down selection window 810, a thumbnail window 804, and a thumbnail image 812.

The menu operates by allowing the user to select a desired unit, such as a window frame. The menu label 802 is typically located at the top of the menu to provide guidance to a user so as to better prevent confusion. The first pull-down selection window 806 is to allow the user to select the desired unit. The first pull-down selection window 806 contains a complete list of units that the manufacturer provides. The second pull-down selection window 808 is the primary view of the unit selected in the first pull-down selection 806. The primary view generally depicts the overall shape of the unit. In the menu 800, a surroundwindow has been selected as the unit and the primary view is a square top. The selection of a squaretop is the shape of the window frame as opposed to an eyebrowtop, which is a more curved shape.

In addition to selecting both the unit and the primary view, a modifier can be selected. The modifiers are any additional options that can be added to a unit. The selection of the modifier is made as a result of utilizing the third pull-down selection window 810. The modifiers are items that can be added to a unit to provide differing styles or looks. For example, the menu 800 has a selection of a sill. The sill is the bottom portion of the window that provides additional styles. Furthermore, there can be multiple pull-down selection windows or a single pull-down selection window, as shown in FIG. 8, for each of the pull-down selection windows.

Also included in the menu 800 is a picture window. Contained within the picture window is a picture of the selected unit with all of the included features. As a selection is made, be it a unit, a primary view, or a modifier, the picture is updated. The advantage to having a continually updating picture is to provide real-time feedback to a user. The user, then, can properly select his or her desired features in an efficient manner.

Figure 9:
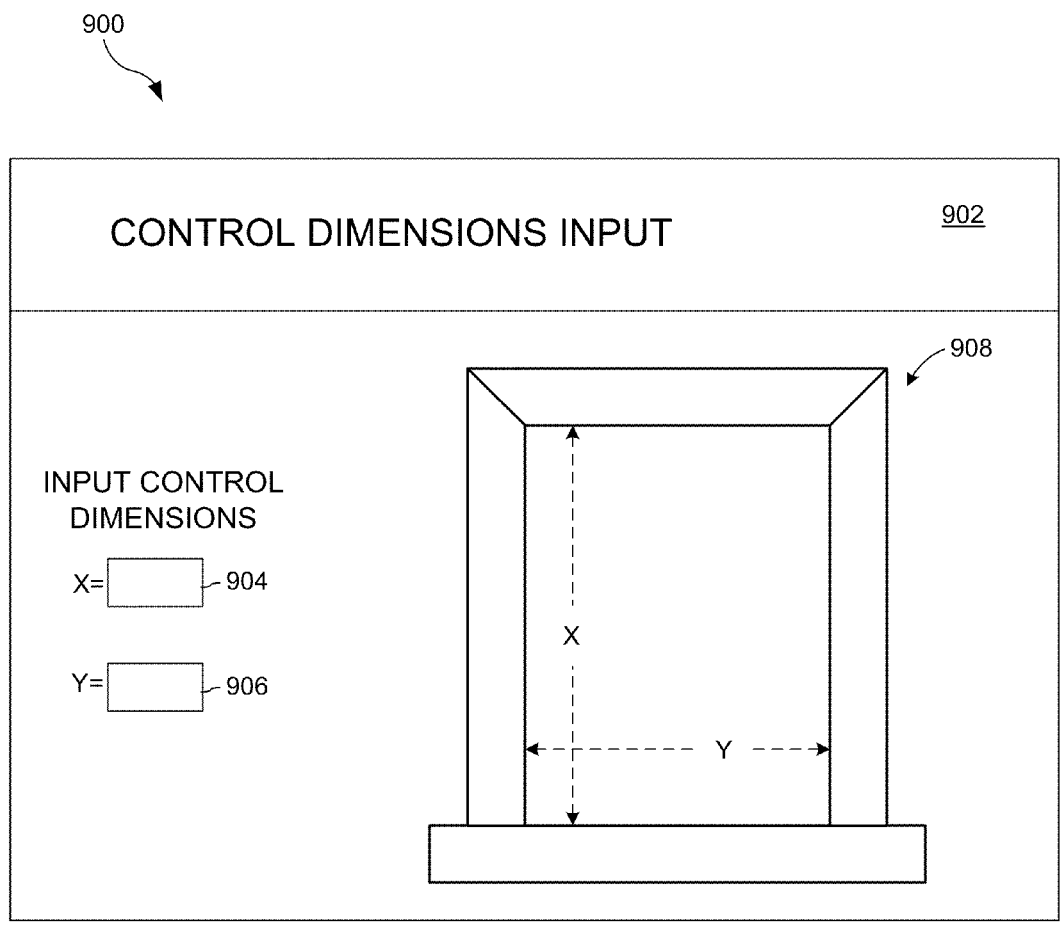
FIG. 9 is a block diagram depicting a dimension input menu.

Referring to FIG. 9 of the drawings, the reference numeral 900 generally designates a block diagram depicting a dimension input menu. The control menu 900 comprises a unit picture 908, a menu label 902, a first control dimension input 904, and a second control dimension input 906.

The menu operates by allowing the user to input the desired dimensions of a unit, such as a window frame. The menu label 902 is typically located at the top of the menu to provide guidance to a user so as to better prevent confusion. The first control dimension input 904 and the second input dimension input 906 allow the user to enter n the dimension of the unit. There can be a single dimension or multiple dimensions, as shown in FIG. 9. There can also be a number of additional dimensions, such as radius, that can be unit specific. Moreover, there are a number of measurement units that can be utilized as input dimensions, such as English, Meter-Kilogram-Second (MKS), Centimeter-Gram-Second (CGS), and so forth.

Entering a measurement unit into a computer does not necessarily assist a user in attaining his or her desired dimensions. As a matter of fact, it may be difficult to ascertain which dimension each of the inputs refers to. The unit picture 908, though, provides all of the necessary detail for the user to have a firm understanding of the correlation between the respective control dimensions and the physical measurements of the unit. As an example in FIG. 9, the first control input dimension 904 corresponds to the inner height of the window frame depicted by the unit picture 904, and the second control input dimension 906 corresponds to the inner width of the window frame depicted by the unit picture 904. Therefore, a user is able to visualize a unit, which is composed of manufactured stone, complete with actual physical dimensions, wherein the physical dimensions are calculated through the use of a plurality of parametric equations.

Figure 10:
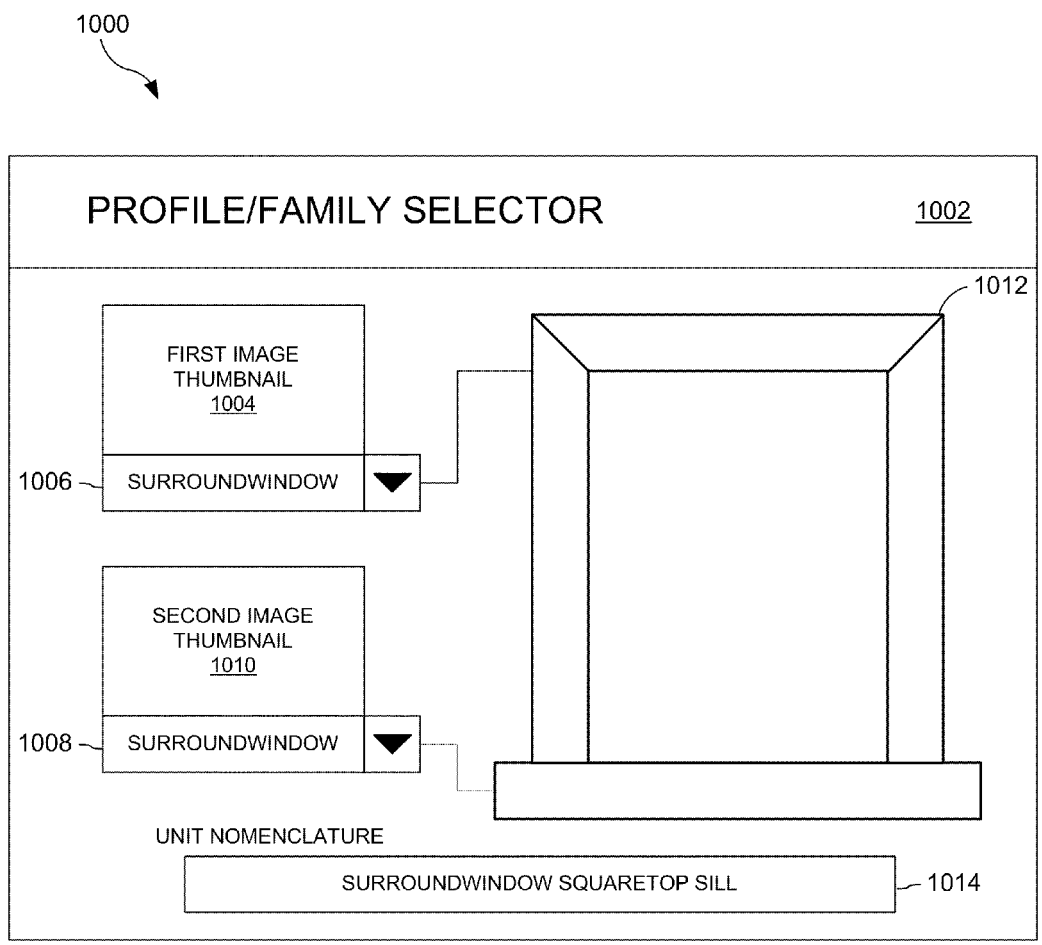
FIG. 10 is a block diagram depicting a profile/family selector menu.

Referring to FIG. 10 of the drawings, the reference numeral 1000 generally designates a block diagram depicting a profile/family selector menu. The profile menu 1000 comprises a menu label 1002, a unit picture 1012, a first profile selection window 1006, a second profile selection window 1008, a first image thumbnail 1004, a second image thumbnail 1010, and a unit label 1014.

The menu operates by allowing the user to input the desired unit profile, such as a window frame. The menu label 1002 is typically located at the top of the menu to provide guidance to a user so as to better prevent confusion. Essentially, usually the profiles are horizontal cross-sectional views of various parts that make up the unit. However, a profile can also be of a variety of other types of profiles such as an overall view of a plurality of three dimensional leaves that appear as a molding. With each selection window there is an associated image thumbnail to depict the shape of the profile to a user. In FIG. 10, the first profile selection window 1006 is associated with the first thumbnail image 1004, and the second profile selection window 1008 is associated with the second thumbnail image 1010. Also, a unit label 1014 is provided. The unit label 1014 can display specific unit nomenclature, such as Surroundwindow Squaretop Sill as shown in FIG. 10.

Typically, the number of image thumbnails and selection profiles corresponds to the number of selectable profiles of a unit. For example, the window frame of FIG. 10 has two sections where the profile can be different. It is possible to have a system where a profile for each individual part of a unit is selectable. However, according to the majority of aesthetic conventions, certain portions, such as the top three parts of the window frame of FIG. 10, have the same profile. Hence, for the sake of simplicity, certain parts of units are presumed to have a uniform profile so as to not overload a user with too many possible selections.

In the window of FIG. 10, certain aesthetic conventions have been adhered to so a user can select the desired profiles. Accordingly, the user is prompted to select a profile for the top three parts of the window frame from the first profile selection window 1006, and the user is prompted to select a profile for the sill of the window frame from the second profile selection window 1008. Once each of the respective profiles has been selected, then a thumbnail image of the selected profile for each of the top three parts of the window frame appears as the first image thumbnail 1004, and a thumbnail image of the selected profile for the sill of the window frame appears as the second image thumbnail 1010. Therefore, a user can mix and match varying profiles of portions of the unit to attain a desire aesthetic look in real-time for the stonework.

Figure 11:
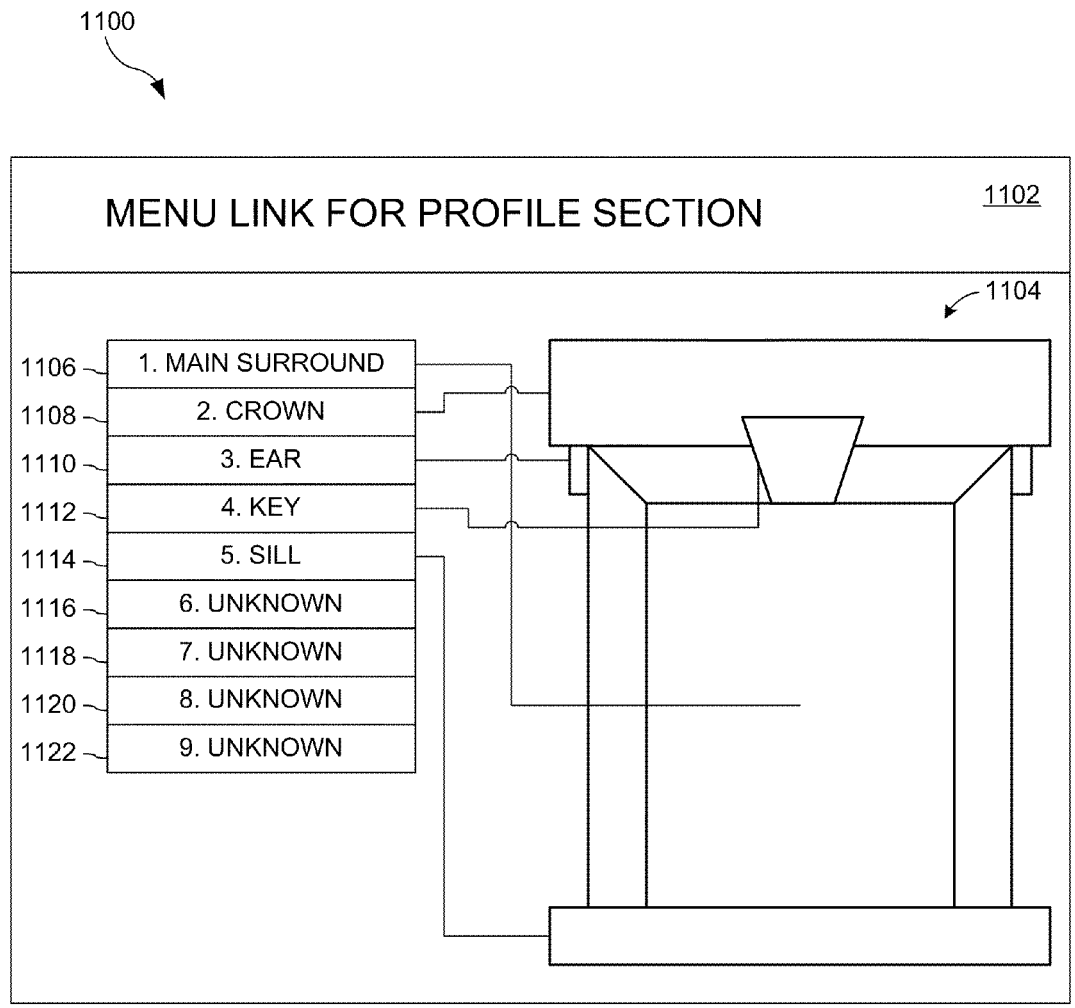
FIG. 11 is a block diagram depicting a link menu.

Referring to FIG. 11 of the drawings, the reference numeral 1100 generally designates a block diagram depicting a link menu. The link menu 1100 comprises a menu label 1102, a unit picture 1104, a first selection slot 1106, a second selection slot 1108, a third selection slot 1110, a fourth selection slot 1112, a fifth selection slot 1114, a sixth selection slot 1116, a seventh selection slot 1118, an eighth selection slot 1120, and a ninth selection slot 1122.

The menu operates by allowing the user to input the desired unit additions, such as a window sill. The menu label 1102 is typically located at the top of the menu to provide guidance to a user so as to better prevent confusion. Overall, though, the link menu is typically associated and selected from the profile menu 1000 of FIG. 10. There can be other features that can be added to a given unit that are characteristically more like a profile, such as a key. These other features are selected at the same time or near the same time that a profile is selected due to that logical association.

In the example in FIG. 11, features are added to the window frame. Each of the selection slots, though, corresponds to a different feature of the window. The first slot 1106 is associated with the main surround. The second slot 1108 is associated with a crown. The third slot 1110 is associated with an ear. The fourth slot 1112 is associated with a key. The fifth slot 1114 is associated with the sill. The sixth slot 1116, the seventh slot 1118, the eighth slot 1120, and the ninth slot 1122 are each left blank. The user in the link menu 1100 can select all of the features normally associated with the selected unit. It is possible to have a virtually infinite number of additional features that can be added to any given unit; however, the additional features that can be selected in the link menu 1100 are associated with typical aesthetic conventions.

Figure 12:
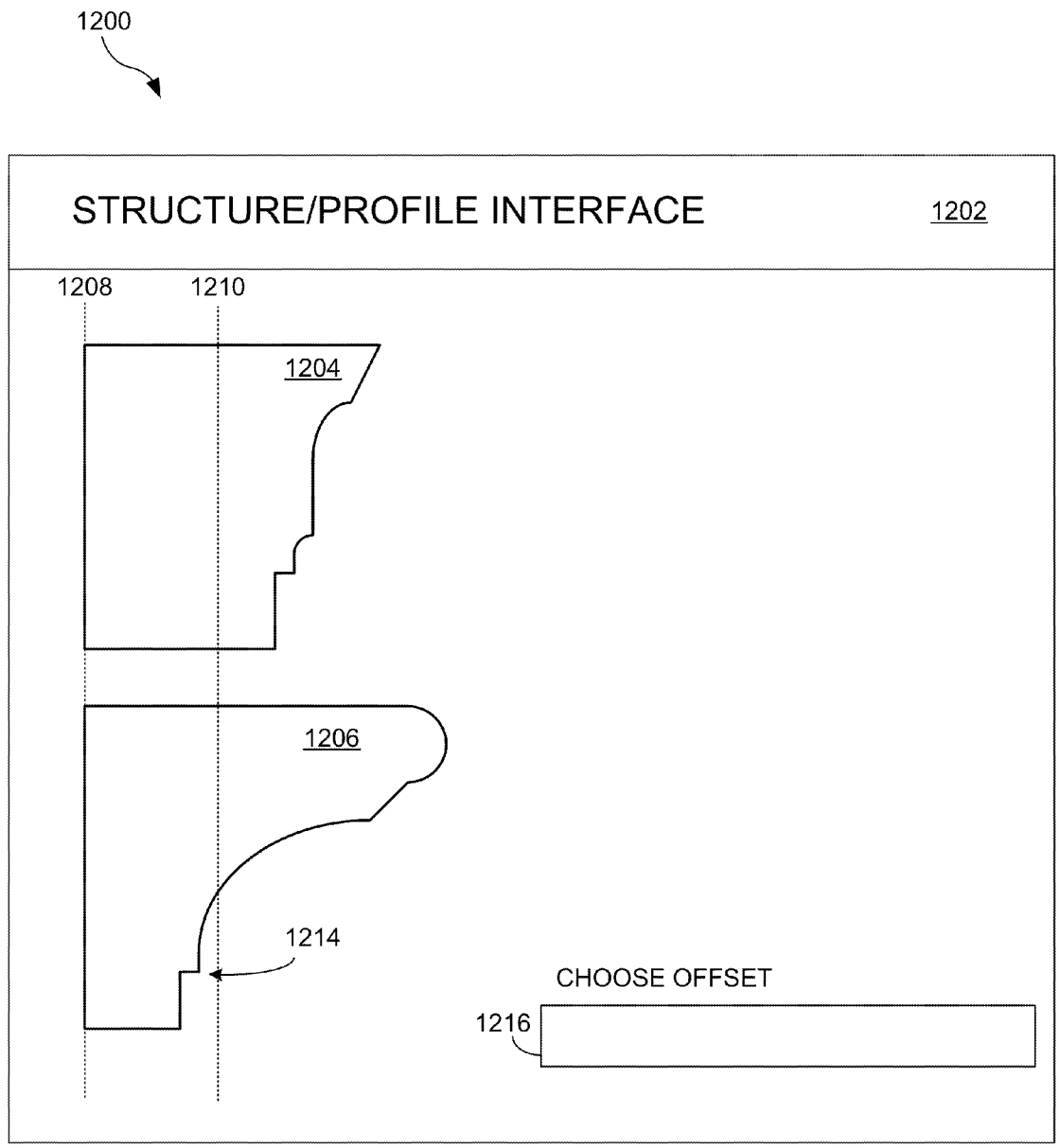
FIG. 12 is a block diagram depicting a first structure/profile interface menu.

Referring to FIG. 12 of the drawings, the reference numeral 1200 generally designates a block diagram depicting a first structure/profile interface menu. The first interface menu 1200 comprises a menu label 1202, a first selected profile 1204, a second selected profile 1206, default back 1208, an offset back 1210, an offset choice slot 1216, and a error point 1214.

The menu operates by allowing the user to input the desired adjustments for unit profiles. The menu label 1202 is typically located at the top of the menu to provide guidance to a user so as to better prevent confusion. In the first profile selection menu 1200, each of the previously selected profiles is displayed. For example, with the window frame, there are two choices for profiles: a profile for the main surround and a profile for the sill. The first profile 1204 corresponds to the profile for the main surround, and the second profile 1206 corresponds to the profile for the sill.

With each profile, there is a default backing 1208. The default backing is the default mounting line where the part is adjacent to a wall or other rigid structure. The only exception to having a default backing is a cap. When a default backing exists, though, the default backing 1208 refers to the resting location for the part possessing the profile. However, to provide maximum flexibility, the user is given the option to choose an offset. The offset is entered in the offset choice slot 1216 and is illustrated by the offset back 1210.

There are cases, though, where the offset can be too large. If the offset is too large, features of the profile can be disturbed or destroyed. For example, the profile of the sill for the window illustrated by the second profile 1206 may lose a portion of the feature associated with the profile because the offset is too large. The error point 1214 is a measurement of when features of a profile may be disturbed or destroyed. If a calculation is made that a feature of a profile may be disturbed or destroyed, then the user can be alerted of the possible ramifications of the choice of such a large offset. Also, there are a number of measurement units that can be utilized as amounts for an offset, such as English, MKS, CGS, and so forth.

Figure 13:
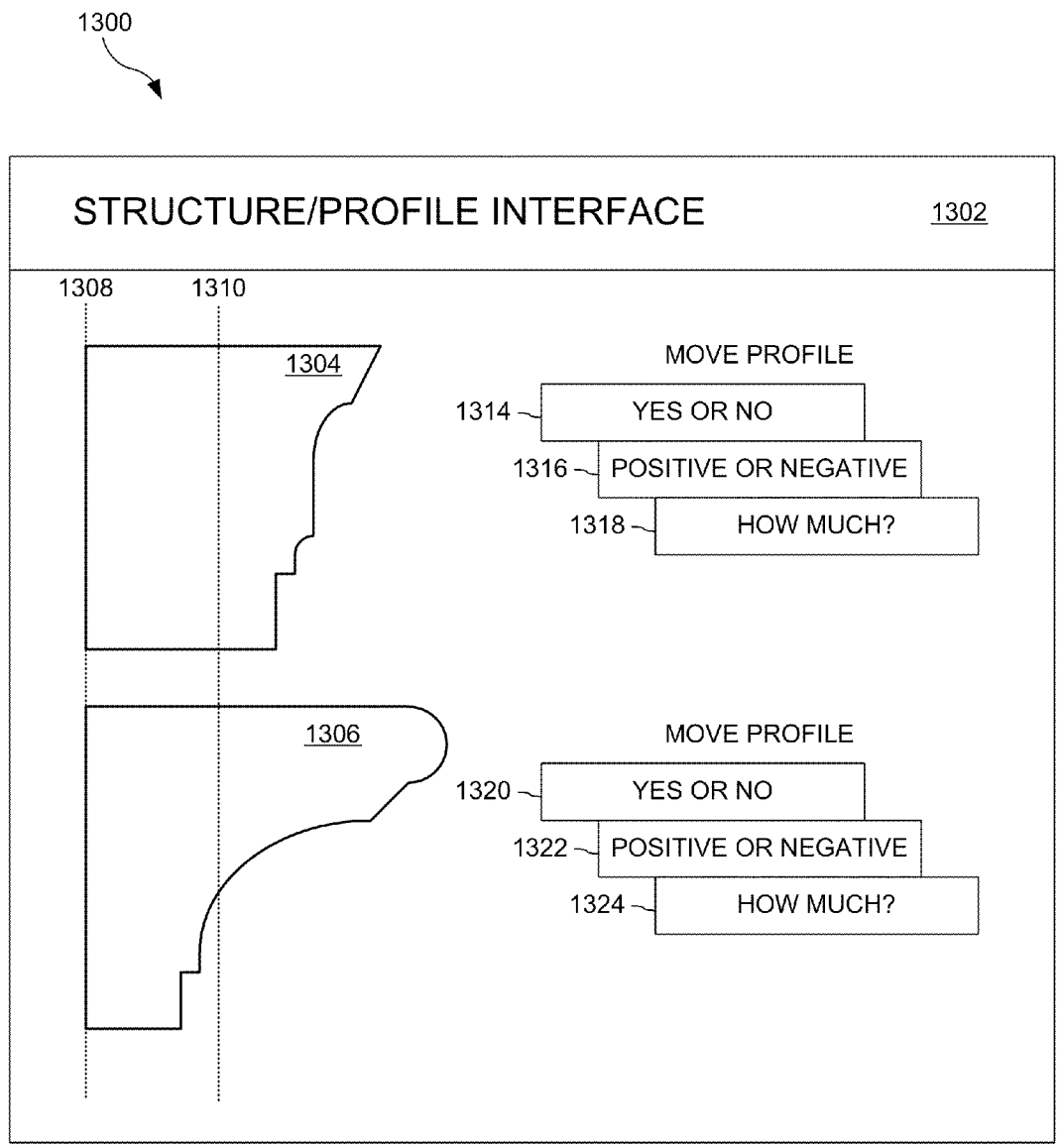
FIG. 13 is a block diagram depicting a second structure/profile interface menu.

Referring to FIG. 13 of the drawings, the reference numeral 1300 generally designates a block diagram depicting a first structure/profile interface menu. The second interface menu 1302 comprises a menu label 1302, a first selected profile 1304, a second selected profile 1306, default back 1308, a user-defined offset 1310, a first prompt 1314, a second prompt 1316, a third prompt 1318, a fourth prompt 1320, fifth prompt 1322, and a sixth prompt 1324.

The menu operates by allowing the user to input the desired adjustment for unit profiles. The menu label 1302 is typically located at the top of the menu to provide guidance to a user so as to better prevent confusion. Again with the second profile selection menu 1300, each of the previously selected profiles is displayed. For example, with the window frame, there are two choices for profiles: a profile for the main surround and a profile for the sill. The first profile 1304 corresponds to the profile for the main surround, and the second profile 1306 corresponds to the profile for the sill.

With each profile, there is a default backing 1308 and a user-defined offset 1310. However, to provide maximum flexibility, the profile can also be moved. The user is prompted by the first prompt 1314 to move the first profile 1304 and by the fourth prompt 1320 to move the second profile 1306. If a desires to move either of the respective profiles, then the user can enter whether the profile is to be moved in a positive or negative direction. The second prompt 1316 corresponds to the direction of motion of the first profile 1304, and the fifth prompt 1322 corresponds to the direction of motion of the second profile 1306. Once the direction of motion of the profile is entered by the user, then the user can enter the amount. The third prompt 1318 corresponds to the distance of motion of the first profile 1304, and the sixth prompt 1324 corresponds to the distance of motion of the second profile 1306. Also, there are a number of unit measurement that can be utilized as amounts for an offset, such as English, MKS, CGS, and so forth.

Figure 14:
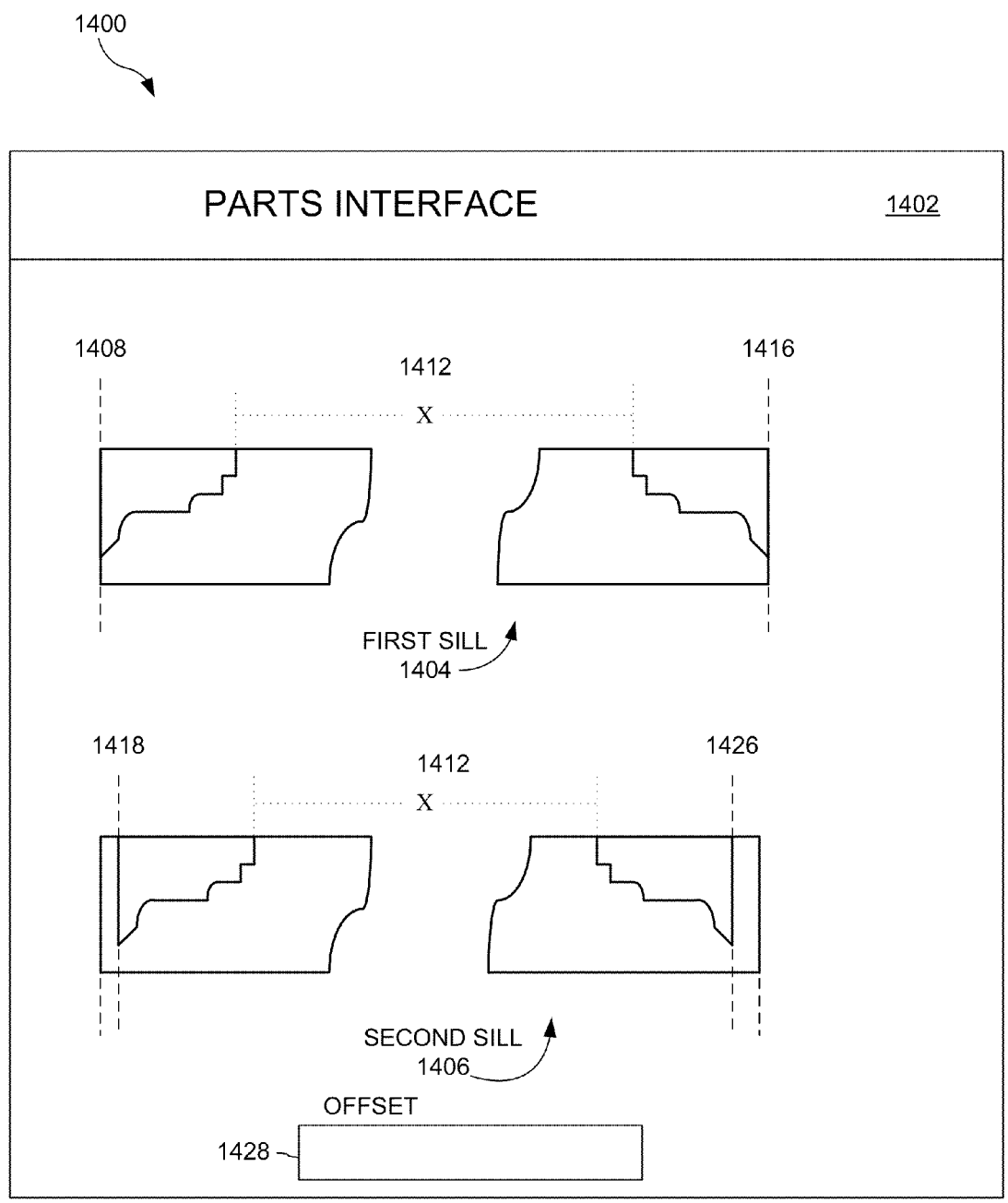
FIG. 14 is a block diagram depicting a parts interface menu.

Referring to FIG. 14 of the drawings, the reference numeral 1400 generally designates a block diagram depicting a parts interface menu. The parts interface menu 1400 comprises a menu label 1402, a first sill view 1404, a second sill view 1406, a first surround intersection 1410, a second surround intersection 1414, a third surround intersection 1420, a fourth surround intersection 1424, a predefined dimension 1412, a first outer surround boundary 1408, a second outer surround boundary 1416, a third outer surround boundary 1418, a fourth outer surround boundary 1420, an offset prompt 1428, and an offset 1422.

The menu operates by allowing, the user to input the desired adjustments to the unit dimensions. The menu label 1402 is typically located at the top of the menu to provide guidance to a user so as to better prevent confusion. The first sill 1404 is the default view. The first outer surround boundary 1408 and the second outer surround boundary 1416 match the outer edges of the sill while the predefined dimension 1412 is maintained. The first surround intersection 1410 and second surround intersection 1414 can be seen on the surface of the sill, which depicts the location of the surround relative to the sill. This type of view and menu are typically available for any situation where there can be an adjustment between parts, such as between a unit and a modifier like the window frame and sill.

To provide maximum flexibility to a user to choose the aesthetic style, the dimensions of the sill, or other parts, can be adjusted relative to the surround, or other units. The first sill 1404 is the adjusted view. The third outer surround boundary 1418 and the fourth outer surround boundary 1426 do not necessarily match the outer edges of the sill; however, the predefined dimension 1412 is maintained. The third surround intersection 1420 and fourth surround intersection 1424 can be seen on the surface of the sill, which depicts the location of the surround relative to the sill. The customer can enter an offset 1422 into the offset prompt 1428. The offset 1422 in the context of the window frame is defined as the linear distance between the respective outer surround boundary and the edge of the sill; however, the offsets can vary in definition according to the respective usage. It would be more flexible for a user to be able to adjust every distance, but according to normal aesthetic conventions, symmetry is preferred. Also, there are a number of measurement units that can be utilized as amounts for an offset, such as English, MKS, CGS, and so forth.

Figure 15:
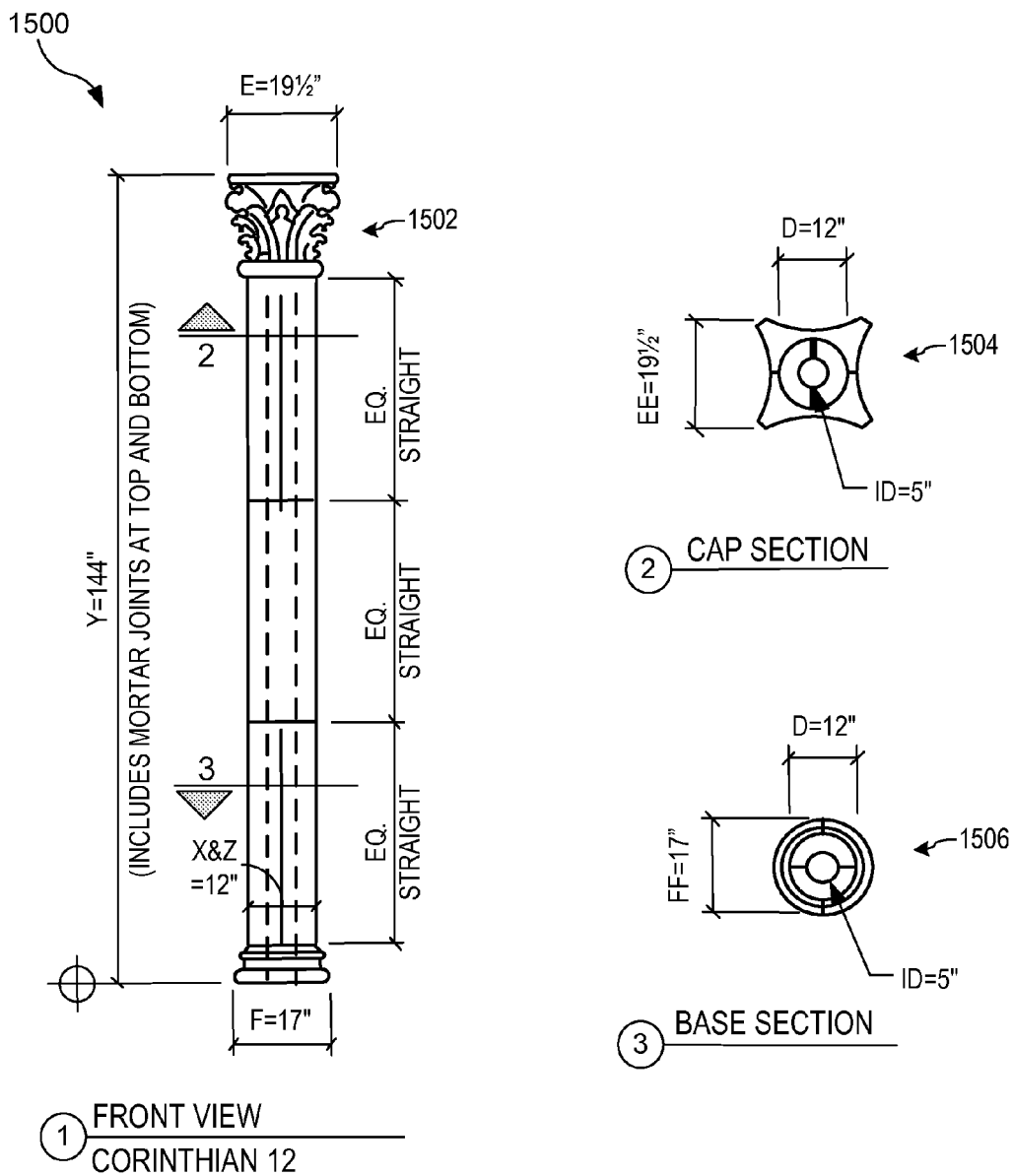
FIG. 15 is a block diagram depicting a CAD drawing.

Referring to FIG. 15 of the drawings, the reference numeral 1500 generally designates a block diagram depicting a CAD drawing. The CAD drawing 1500 comprises a vertical cross-sectional view 1502, a cap horizontal cross-section 1504, and a base horizontal cross section 1506.

The CAD drawing depicts a Corinthian column. The vertical cross-sectional view 1502 is typically considered to be the primary view of the column as it would stand in a building. The drawing 1500, though, is scaled and complete with dimensions (not labeled). Specifically, though, vertical cross section 1502 illustrates both height and width of the column.

However, in order to yield a complete perspective of the overall shape of the column other perspectives or views are included. The cap horizontal cross-section 1504 and the base horizontal cross section 1506 provide the other perspective views. These other views allow for complete consideration of scale. By examining the dimensions of the cap horizontal cross-section 1504 and the base horizontal cross section 1506, taper and the respective radii can be determined, giving a user an overall complete view of the unit to be built. An example of an embodiment of the invention is further described in Appendices A to M, the contents of which are hereby incorporated by reference.

By providing easily usable software to enable either a laymen or more sophisticated professional to choose custom stonework, the economic benefits are substantial. The systems and software allow a user to use graphical interfaces to easily select entire units, like window frames, that are to be custom made of manufactured stone. A user can vary the sizes and styles to fit his or her liking, while eliminating costly procedures involving various craftsmen, such as draftsmen. A computer generates the drawings to scale for the custom stonework that allows a manufacturer to produce the parts of a unit at a greatly reduced cost to a user or consumer. Moreover, the use of a more simplistic, user friendly software package reduces the gargantuan task of designing and producing scaled drawings for manufacturing to a rapid and simple process.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for designing an architectural feature, comprising:
   selecting a unit from a plurality of units, wherein the unit at least corresponds to an architectural feature, and wherein the unit comprises:
   an arrangement of a plurality of parts;
   at least one parametric equation defining at least one physical dimension of the arrangement, the physical dimension comprising a measurement of the arrangement; and
   at least one control dimension comprising a measurement of the arrangement, the at least one control dimension comprising an input of the at least one parametric equation;
   inputting a value of the at least one control dimension; and
   in response to inputting the value of the at least one control dimension, parametrically calculating, using the at least one parametric equation, the at least one physical dimension of the arrangement.

2. The method of claim 1, further comprising selecting a primary view of the unit from a plurality of primary views, wherein the primary view determines an overall shape of the arrangement of the plurality of the parts.

3. The method of claim 1, further comprising adding an additional feature to the unit.

4. The method of claim 1, further comprising selecting a profile of a plurality of profiles for a part of the plurality of parts, wherein the profile determines at least a two-dimensional view of the part.

5. The method of claim 4, wherein the arrangement determines at least a two-dimensional view of the unit comprising a spatial dimension different from the two dimensions in the two-dimensional view determined by the profile.

6. The method of claim 4, further comprising selecting an offset for the part, the offset comprising an amount of translation of the part from a default backing position.

7. The method of claim 1, wherein the arrangement determines a relative size of at least two parts of the plurality of parts.

8. The method of claim 1, wherein the arrangement determines a relative position within the arrangement of at least two parts of the plurality of parts.

9. The method of claim 1, wherein the arrangement determines at least a two-dimensional view of the unit.

10. The method of claim 9, further comprising:
graphically displaying the two-dimensional view of the unit;
graphically displaying a relationship between the at least one control dimension and the at least one physical dimension; and
graphically displaying a relationship between the at least one control dimension and the arrangement.

11. The method of claim 1, further comprising generating a drawing of the architectural feature from the unit.

12. The method of claim 1, further comprising constructing the architectural feature in accordance with the arrangement.

13. A computer program product for designing an architectural feature, the computer program product embodied on a tangible computer readable medium, the computer program product comprising:
computer code for selecting a unit from a plurality of units, wherein the unit at least corresponds to an architectural feature, and wherein the unit comprises:
an arrangement of a plurality of parts;
at least one parametric equation defining at least one physical dimension of the arrangement, the physical dimension comprising a measurement of the arrangement; and
at least one control dimension comprising a measurement of the arrangement, the at least one control dimension comprising an input of the at least one parametric equation;
computer code for inputting a value of the at least one control dimension; and
computer code for, in response to inputting the value of the at least one control dimension, parametrically calculating, using the at least one parametric equation, the at least one physical dimension of the arrangement.

14. The computer program product of claim 13, further comprising computer code for selecting a primary view of the unit from a plurality of primary views, wherein the primary view determines an overall shape of the arrangement of the plurality of the parts.

15. The computer program product of claim 13, further comprising computer code for adding an additional feature to the unit.

16. The computer program product of claim 13, further comprising computer code for selecting a profile of a plurality of profiles for a part of the plurality of parts, wherein the profile determines at least a two-dimensional view of the part.

17. The computer program product of claim 16, wherein the arrangement determines at least a two-dimensional view of the unit with a spatial dimension different from the two dimensions in the two-dimensional view determined by the profile.

18. The computer program product of claim 16, further comprising computer code for selecting an offset for the part, the offset comprising an amount of translation of the part from a default backing position.

19. The computer program product of claim 13, wherein the arrangement determines a relative size of at least two parts of the plurality of parts.

20. The computer program product of claim 13, wherein the arrangement determines a relative position within the arrangement of at least two parts of the plurality of parts.

21. The method of claim 13, wherein the arrangement determines at least a two-dimensional view of the unit.

22. The method of claim 21, further comprising:
graphically displaying the two-dimensional view of the unit;
graphically displaying a relationship between the at least one control dimension and the at least one physical dimension; and
graphically displaying a relationship between the at least one control dimension and the arrangement.

23. The computer program product of claim 13, further comprising computer code for generating a drawing of the architectural feature from the unit.

* * * * *